H. L. TANNER.
TRANSMISSION SYSTEM FOR AUTOMOBILES.
APPLICATION FILED AUG. 18, 1916.

1,424,860.

Patented Aug. 8, 1922.
2 SHEETS—SHEET 1.

INVENTOR
HARRY L. TANNER.
BY
Herbert H. Thompson,
ATTORNEY.

H. L. TANNER.
TRANSMISSION SYSTEM FOR AUTOMOBILES.
APPLICATION FILED AUG. 18, 1916.

1,424,860.

Patented Aug. 8, 1922.
2 SHEETS—SHEET 2.

INVENTOR
HARRY L. TANNER.
BY
Herbert H. Thompson
ATTORNEY.

UNITED STATES PATENT OFFICE.

HARRY L. TANNER, OF BROOKLYN, NEW YORK.

TRANSMISSION SYSTEM FOR AUTOMOBILES.

1,424,860.  Specification of Letters Patent.  Patented Aug. 8, 1922.

Application filed August 18, 1916. Serial No. 115,665.

*To all whom it may concern:*

Be it known that I, HARRY L. TANNER, a citizen of the United States, residing at 221 Eastern Parkway, Brooklyn, in the county of Kings and State of New York, have invented certain new and useful Improvements in Transmission Systems for Automobiles, of which the following is a specification.

This invention relates to electro-dynamic means for transmitting power especially adapted for the driving of motor driven vehicles from internal combustion engines. The main object of my invention is to improve upon the present systems of this character whereby the size and capacity of the dynamo-electric unit may be decreased to about one-half the value required in the present types of machines. Another object is to devise a simple means whereby the same machine used in transmission may be used to start the engine from a low voltage battery.

To accomplish this result, I have devised a system which while it resembles in appearance the existing types of machines, differs radically from them in principle of operation. I employ a plurality of interconnected dynamo-electric machines coupled both to the primary source of power and to the load or driven element, but I so connect the machines electrically and mechanically that when the engine is exerting its maximum power both machines are utilized to their full capacity. Another equally important and novel result that I secure under such circumstances is that the machine which is coupled to the load and through which the entire torque must be exerted, is driven at a speed much in excess of the speed of the power source. With my preferred design this speed approximates double the speed of the power source. Referring to the drawings in which what I now consider to be the preferred forms of my invention are shown:—

Figure 1:
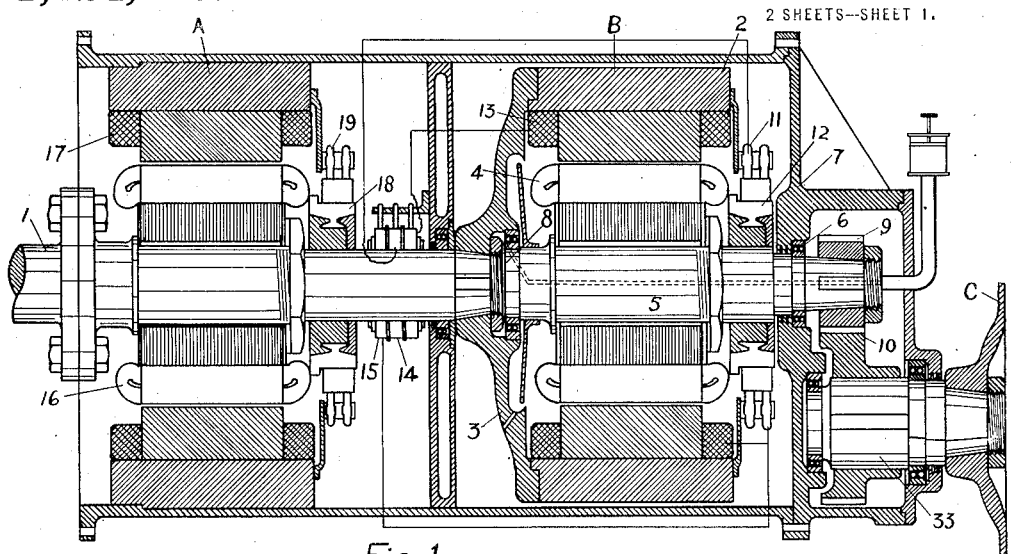
Fig. 1 is a longitudinal section of an electrical unit embodying my invention.
Figure 2:
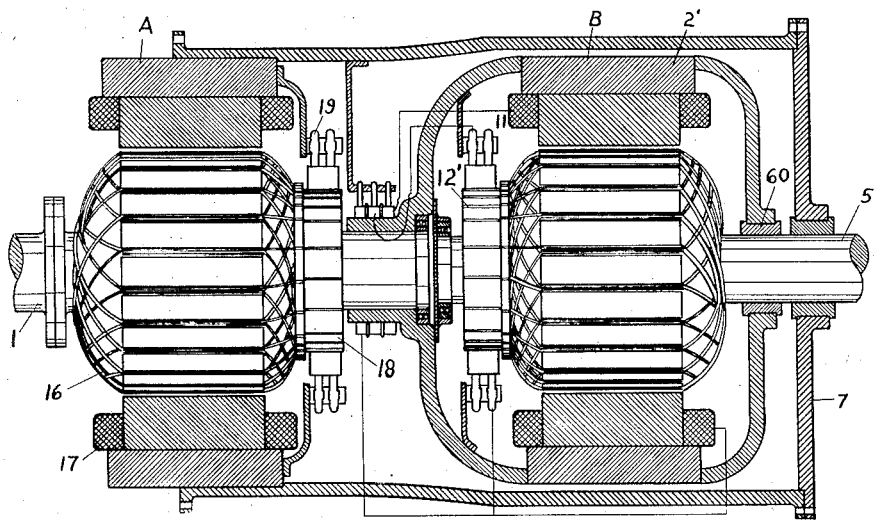
Fig. 2 is a corresponding section showing a slight modification in the mechanical details.

In Figures 1 and 2, the main power source is not shown but the shaft coupled thereto is shown at 1. The two dynamo-electric machines are shown at A and B. Machine B comprises a plurality of rotatable parts, one of which is driven from the power shaft 1, while the other is mechanically connected to the driven element C or load. I prefer to connect the field 2 of machine B to shaft 1 as by means of a spider 3 driven upon or otherwise secured thereto. The armature 4 is mounted on a shaft 5 rotatable independently from shaft 1 and journalled at 6 in the casing 7 adjacent its outer end and within spider 3 at its inner end 8. Reduction gears 9 and 10 may be provided between shaft 5 and the element C which may represent the drive shaft of an automobile for a purpose which will presently appear.

The brushes 11 for commutator 12 are secured to the field so as to revolve therewith, and current is introduced thereto as well as to the field coils 13 through slip rings 14 on shaft 1. Only three rings need be used, as one ring 15 may form a common return for the armature and field.

Machine A also has one part thereof driven from a power source, preferably the same power source. For this purpose, its armature 16 may be mounted directly on shaft 1 and the field 17 fixed to casing 7. The commutator and brushes are shown at 18 and 19 respectively. Both machines A and B are preferably shunt wound, although the type of connections used varies somewhat from the standard shunt winding.

Figure 4:
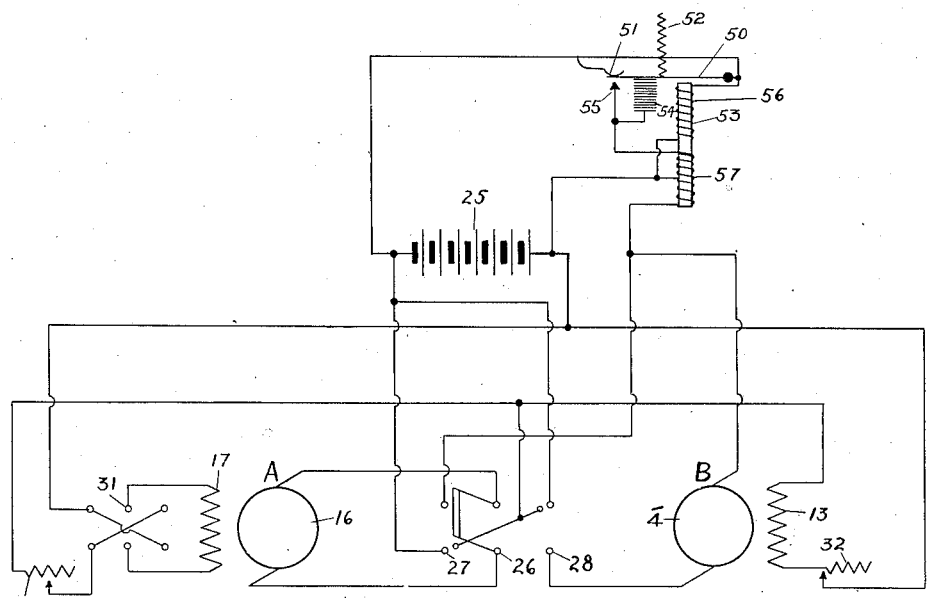
Fig. 4 is a wiring diagram applicable to all of the above forms of the invention.

Referring now to Fig. 4 in which the electrical connections are shown, the machines A and B will at once be recognized. The fields 13 and 17 of the two machines are preferably wound for a comparatively low voltage (say from 6 to 24 volts) while the armatures are wound for a much higher voltage, which may approximate the commercial voltages used. A storage battery 25 the voltage of which corresponds to that of the field windings is connected to both windings in parallel therewith and also in series with the two armature windings 4 and 16. Preferably the armatures are wound for slightly different voltages, B being higher than A by an amount approximately equal to the voltage of battery 25. Interposed in the electrical connections is a double throw switch 26 adapted to change the connections to spin the engine in starting. In the starting position, the switch which is connected to armature 16 is thrown in contact with points 27 so that the battery is directly connected thereto. Machine A will then act as a motor, since the field is also excited from battery 25, and turn over the engine. Machine B will be idle during this time, as its armature is open circuited. As soon as the engine is started, the switch is thrown into contact with points 28, in which position the two armatures and the battery will be in series. No torque will be produced on the propeller shaft, however, since, if the two fields are equal the E. M. F. of the armature 4 will just balance the E. M. F. of 16 plus that of battery 25.

To cause a torque to be applied to said shaft, I provide means for varying the relative E. M. F.'s of the two machines. For this purpose a variable resistance 30 and a pole-changing switch 31 are placed in the circuit of field 17 and a second variable resistance 32 in the circuit of field 13. Any suitable form of controller may be used to operate the said resistances and switch.

Starting with the engine running, but with the automobile standing, it will be seen that by weakening the field of motor A, as by cutting in a portion of resistance 30 that its E. M. F. will be reduced below that of B. The result will be that a current will be generated in B and will flow from B through battery 25 and machine A, operating it as a motor. The production of a current in B will tend to drag its armature 4 with the revolving field, so that a torque will be produced on the propeller shaft 33 and the load started. All slip that takes place between the field and armature is made use of to produce current which aids in driving the power source through motor A. To increase the speed, more of resistance 30 is cut in, resulting in an increased flow of current and an increased torque on 4.

When the speed of armature 4 approaches that of field 2, the field 17 may be entirely opened, so that armature 4 is virtually short circuited. It is at this point in the operation that the great difference between my invention and the prior art manifests itself and the great advantages of my invention become apparent. I propose to further increase the speed of the load by reversing the field of machine A relative to its armature, while its field is weak. While I might accomplish this by reversing the armature connections I have shown at 31 in Fig. 4 a reversing switch in the field connections. This will result in machine A becoming a generator but the current will still flow in the same direction through battery 25 and armature 4. Machine B will therefore become a motor and armature 4 will be driven ahead of the rotating field 2. Resistance 30 may then be gradually cut-out, strengthening field 17 and driving armature 4 at a greater speed. In the final running position, therefore, which corresponds to "high gear" armature 4 is driven at approximately twice the speed of the field 2, and hence machine B need be only about one-half of the capacity employed in other types of electric transmission systems.

My invention is also readily adapted for reversing the direction of drive of the load. For this purpose I propose to reduce the field strength of machine B, as by means of resistance 32 above described. This will reduce the E. M. F. of machine B, causing machine A to act as a generator and B as a motor, but causing its armature 4 to revolve in the opposite direction to its field 2. A slow but effective reverse will therefore be produced.

In order to protect the battery and prevent overcharging, an automatic cut-out may be employed. A pivoted contact arm 50 is normally drawn into contact with switch point 51 by a spring 52. As soon, however, as magnet 53 becomes sufficiently energized, arm 50 will be drawn into contact with the pile of carbon discs 54, but its contact with 51 will not at first be broken as 51 is preferably made in the form of a spring so that it will follow arm 50 during the first portion of its movement. A portion of the current flowing between the armatures 4 and 16 will therefore be shunted around the battery. If the strength of magnet 53 is further increased, the carbon discs will be further compressed and their resistance reduced until contact 55 is made when the battery and resistance are entirely cutout. The strength of magnet 53 is governed by a shunt coil 56 and by a series coil 57, so that the switch is responsive to both the total current in the circuit and to the effective E. M. F. of the battery. Preferably the current from the battery is led into an intermediate point of coil 57, so that in case the battery voltage becomes greater than that of the line, coil 57 will be weakened and the switch 55 opened so that the battery is prevented from discharging around through said switch.

Figure 3:
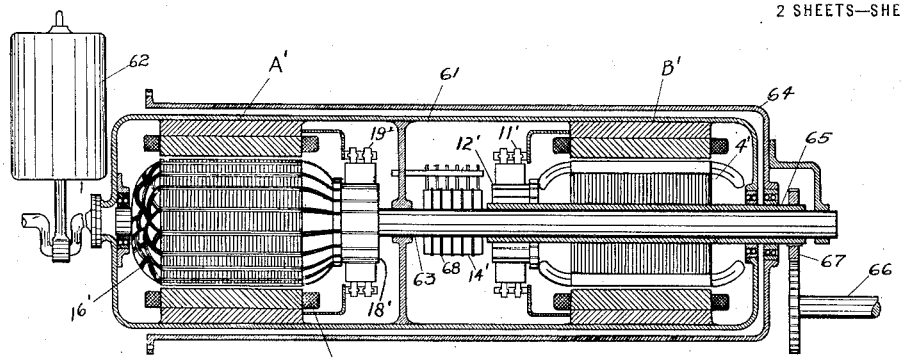
Fig. 3 is a similar section showing a second modification.

Figs 2 and 3 illustrate two of the many modifications in mechanical detail which my invention may assume. I also wish it understood that my invention is not limited to the employment of direct current machines, but that either one or both of the machines may be of the alternating current type. Fig. 2 illustrates how a bearing 60 may be provided for the outside end of the rotatable field 2', and at the same time the commutator 12' placed adjacent commutator 18. This figure also shows that the reduction gears 9 and 10 are not essential to my invention.

In Fig. 3 a further modification is shown in which the fields of both machines A' and B' are made rotatable, while the armature 16' of machine A' is fixed. The two fields may be secured to a common frame 61 driven directly from the engine 62, so that a large, well balanced fly wheel is secured. Armature 16' is mounted on a fixed shaft 63, journalled at its inner end in frame 61 and secured adjacent its outer end to the casing 64. Armature 4' is placed upon a sleeve 65 rotatably mounted on shaft 63 and journalled in both rotatable frame 61 and the fixed casing 64. Sleeve 65 is shown as connected to the drive shaft 66 through reduction gears 67. The brushes 11' and 19' are secured to the rotating frame 61 or to the fields, and a plurality of slip rings 14' and 68 are provided for each field.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a transmission device, the combination with a power source and a driven element, a dynamo electric machine comprising relatively rotatable parts, one of which is coupled to said power source and another to said element, a second dynamo electric machine mechanically coupled therewith, a source of E. M. F. electrically connected to said dynamo electric machines, and means for weakening the field of said first machine whereby the load is driven in the opposite direction from the power source.

2. In a means for starting a load from a rotating power source, the combination with a primary power source and a driven element, of a dynamo electric machine comprising relatively rotatable parts one of which is coupled to said power source and another to said element, a second dynamo electric machine coupled to said source, electrical inter-connections between said machines, means for first weakening the field of said second machine, whereby the first machine acts as a generator and said second machine as a motor, means for reversing the field of said second machine relative to its armature, and means for weakening the field of said first machine whereby the load is driven entirely by said first machine acting as a motor.

3. In a transmission system, a plurality of dynamo electric machines, a primary source of power coupled to both machines to cause said machines to generate opposing E. M. F.'s, a driven element coupled to one machine, electrical interconnections between said machines, a source of E. M. F. in circuit with said machines, means whereby the E. M. F. of one machine is balanced by the combined E. M. F.'s of the other machine and said source of E. M. F., and means for weakening the field of the machine of lesser E. M. F. whereby the power generated by said primary source of power is transmitted to said driven element.

4. In a transmission system as claimed in claim 3, means for connecting said source of E. M. F. directly to the armature of one of said dynamo electric machines for setting said source of power in motion.

5. A transmission system as claimed in claim 3, wherein the machine of greater E. M. F. comprises relatively rotatable parts, one coupled to said primary source of power and another to said driven element, and means for reversing the field of the machine of lesser E. M. F. with relation to its armature, whereby the second mentioned part of the first mentioned machine is driven ahead of the first mentioned part.

6. In a transmission system as claimed in claim 5, means for weakening the field of the machine of greater E. M. F. whereby the second mentioned part of said machine is driven in the opposite direction to the first mentioned part by current generated by the machine of lesser E. M. F.

7. In a transmission system, a plurality of dynamo electric machines, means including a primary source of power coupled to both machines for causing said machines to generate opposing E. M. F.'s, a driven element coupled to one machine, electrical interconnections between said machines, a source of E. M. F. in circuit with said machines, the armatures of said machines being so wound as to cause the E. M. F. of one machine to be substantially equal to the combined E. M. F.'s of the other machine and said source of E. M. F., and means for weakening the field of the machine of lesser E. M. F. for causing the power generated by said primary source of power to be transmitted to said driven element.

8. In a transmission system as claimed in claim 7, means for connecting said source of E. M. F. directly to the armature of one of said dynamo electric machines for setting said source of power in motion.

9. A transmission system as claimed in claim 7, wherein the machine of greater E. M. F. comprises relatively rotatable parts, one coupled to said primary source of power and another to said driven element, and means for reversing the field of the machine of lesser E. M. F. with relation to its armature, whereby the second mentioned part of the first mentioned machine is driven ahead of the first mentioned part.

10. In a transmission system as claimed in claim 9, means for weakening the field of the machine of greater E. M. F. whereby the second mentioned part of said machine is driven in the opposite direction to the first mentioned part by current generated by the machine of lesser E. M. F.

In testimony whereof I have affixed my signature.

HARRY L. TANNER.